US012717610B2

(12) United States Patent
Kalra et al.

(10) Patent No.: US 12,717,610 B2
(45) Date of Patent: Aug. 25, 2026

(54) DETECTING INTERRUPTION EVENTS WITHIN AN APPLICATION WORKFLOW

(71) Applicant: Maplebear Inc., San Francisco, CA (US)

(72) Inventors: Siddarth Kalra, Toronto (CA); Gareth Pennington, Aurora (CA); Sumiran Pradhan, Bothell, WA (US); Levon Dolbakian, Berkeley, CA (US); Eric Guffey, Mountain View, CA (US)

(73) Assignee: Maplebear Inc., San Francisco, CA (US)

( * ) Notice: Subject to any disclaimer, the term of this patent is extended or adjusted under 35 U.S.C. 154(b) by 590 days.

(21) Appl. No.: 18/324,783

(22) Filed: May 26, 2023

(65) Prior Publication Data

US 2024/0394093 A1 Nov. 28, 2024

(51) Int. Cl.
*G06Q 10/0633* (2023.01)
*G06F 9/448* (2018.01)
*G06F 9/48* (2006.01)

(52) U.S. Cl.
CPC .......... *G06F 9/4812* (2013.01); *G06F 9/4498* (2018.02)

(58) Field of Classification Search
CPC ............. G06F 11/0709; G06F 11/0772; G06F 11/0793; G06F 9/4812; G06F 9/4498
USPC .......................................................... 718/102
See application file for complete search history.

(56) References Cited

U.S. PATENT DOCUMENTS 9,990,238 B2 * 6/2018 Seago ..................... G06F 9/542
2017/0060792 A1 * 3/2017 Kesler ................... G06F 9/4881
2018/0203751 A1 * 7/2018 Lee ....................... G06F 11/079
2021/0157692 A1 * 5/2021 MacCarthaigh .... G06F 11/0757
2023/0088015 A1 * 3/2023 Liu ......................... G01S 1/045 367/118
2023/0125661 A1 * 4/2023 Jebakumar ........... G06F 9/4856 718/1
2024/0143482 A1 * 5/2024 Lim .................... G06F 11/0781
2024/0354176 A1 * 10/2024 Sampath ................ G06N 3/088

* cited by examiner

*Primary Examiner* — Pierre Vital
*Assistant Examiner* — Daniel Trainor
(74) *Attorney, Agent, or Firm* — Fenwick & West LLP

(57) ABSTRACT

An online system predicts a number of interruption events within a time period and identifies anomalous numbers of interruption events using an interruption prediction model. The online concierge system maintains application state data that describes a state of an application workflow for a client application. The online concierge system identifies interruption events that represent interruptions to the application workflow and logs interruption events in an interruption log, wherein each entry of the interruption log describes an interruption event and its corresponding state. The online concierge system predicts a number of interruption events that will occur within a time period based on an interruption prediction model. The online concierge system computes an actual number of interruption events that occurred during the time period and computes a difference between the actual number and the predicted number. If the difference exceeds a threshold value, the online concierge system performs a remedial action.

18 Claims, 5 Drawing Sheets

DETECTING INTERRUPTION EVENTS WITHIN AN APPLICATION WORKFLOW

BACKGROUND

Online systems, such as online concierge systems, provide a client application for users to interact with the online system. These client applications provide an application workflow for the user to progress through for the user to achieve some end result. For example, a user may progress through an application workflow of an online concierge system's client application to place an order with the online concierge system.

These application workflows can be incredibly complicated for developers to implement and maintain, and the software code may include errors that cause interruption events to occur while a user is using the client application. With sufficiently large online systems, developers generally assume that some number of interruption events will occur during operation of online systems, since the complexity of the systems means that it would be almost impossible to eliminate all possible issues in the code. However, as new features are developed for an online system or as the environment around the online system changes, the rate of interruption events may exceed the tolerances set by developers, which may be indicative of large enough issues that developers would want to address.

An online system may use static thresholds for interruption event rates, which simply determine whether the number of interruption events within a given time period exceeds some threshold value. However, these methods for detecting anomalous numbers of interruption events fail to consider contextual information that may impact whether a change in the number of interruption events is caused by an issue with the online system. For example, an online concierge system may experience more interruption events during bad weather because more users are using the system than is typical. Thus, an online concierge system using a static threshold value may see the number of interruption events exceeding the threshold value, but this may be limited to when the cause of the anomaly was external to the online system. Furthermore, these approaches generally do not identify where in the application workflow the interruption events occur, nor do they consider how contextual information can impact interruption events at one stage of an application workflow versus another.

SUMMARY

In accordance with one or more aspects of the disclosure, an online system performs remediation actions based on whether a predicted number of interruption events for a time period exceeds an actual number of interruption events during that time period. The online system maintains application state data for a client device. The application state data describes a current state of an application workflow of a user within a client application operating on the client device. For example, the application state data may describe a most-recent transition of the client application within a state machine that represents states of the application workflow.

The online system identifies an interruption event (such as a fatal error) at the client application, and identifies a state of the application workflow at the time of the interruption event. For example, the online system may identify a most-recent transition of the client application within the state machine and may identify the destination state of that transition as the state of the application workflow when the interruption event occurred. The online system logs an entry in an interruption log for the interruption event. The entry includes a description of the interruption event and the identified state of the application workflow when the interruption event occurred. The interruption log may be stored at the online system and contains entries from multiple client devices that transmit information on interruption events to the online system.

The online system uses an interruption prediction model to predict how many interruption events will occur at a particular application workflow state within some period of time. The interruption prediction model is a machine-learning model that is trained to predict a number of interruption events at a particular state within a time period based on order data and context data. The order data describes orders placed during the time period and the context data describes a broader context for the time period (e.g., weather data, retailer data, or network data). The online system compares the predicted number of interruption events that occurred at a workflow application state to the actual number of interruption events at that workflow application state to determine whether to perform a remedial action. For example, the online system may compute a difference between the predicted number of interruption events and the actual number and compare that computed difference to a threshold value to determine whether to perform a remedial action. If the difference exceeds the threshold value, the online system may perform a remedial action, such as notifying a human operator of the online system that an anomalous number of interruption events have occurred during the time period.

By applying an interruption prediction model, an online system can compare actual numbers of interruption events to predicted ones that are based on information related to the relevant time period. Thus, when the online system detects an anomalous number of interruption events within a client application workflow, the online system can be more certain that the anomaly represents an error or issue with the application workflow's implementation. Additionally, by predicting interruption events on a per-state basis, the online system can account for differences in how context data and order data impact different application workflow states in identifying anomalous numbers of interruption events. Furthermore, the online system can specifically identify which states are experiencing atypical numbers of interruption events, which can help developers diagnose errors in the client application or the online system.

DETAILED DESCRIPTION

Figure 1:
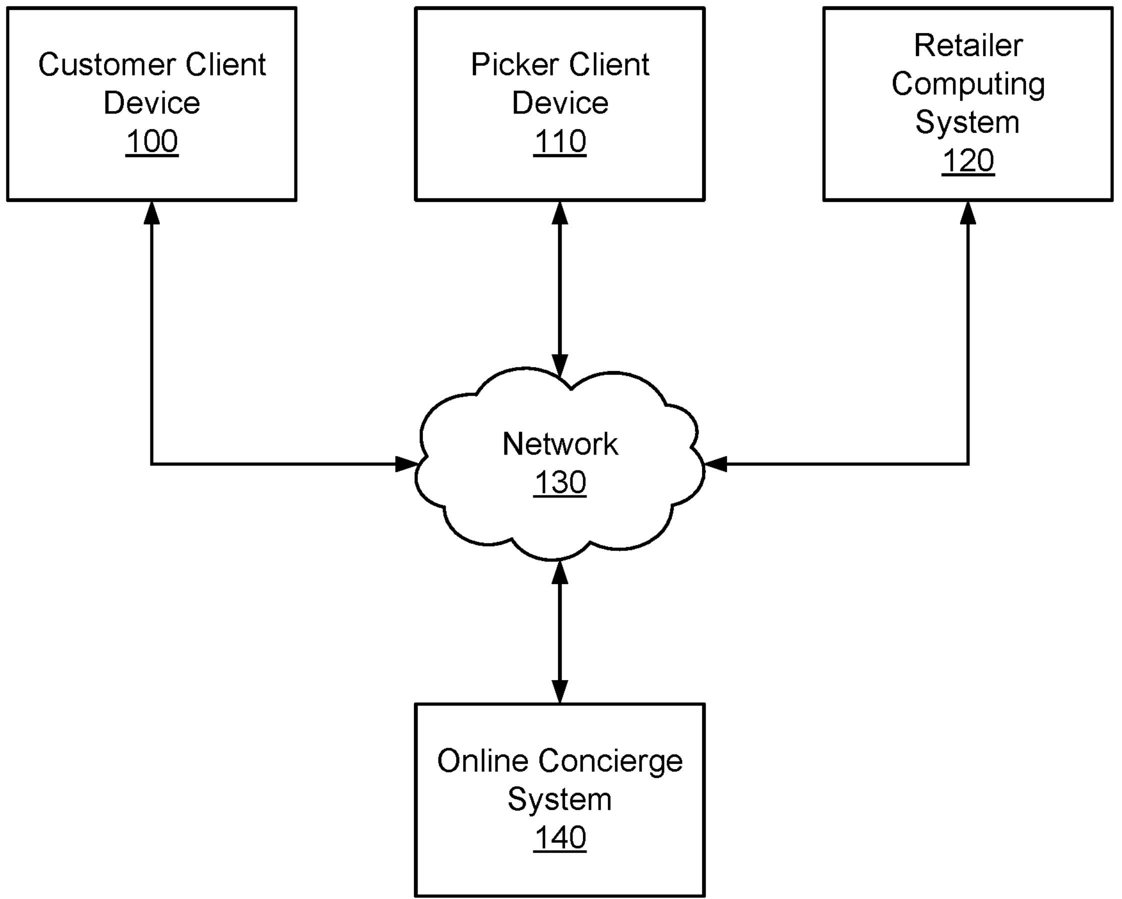
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
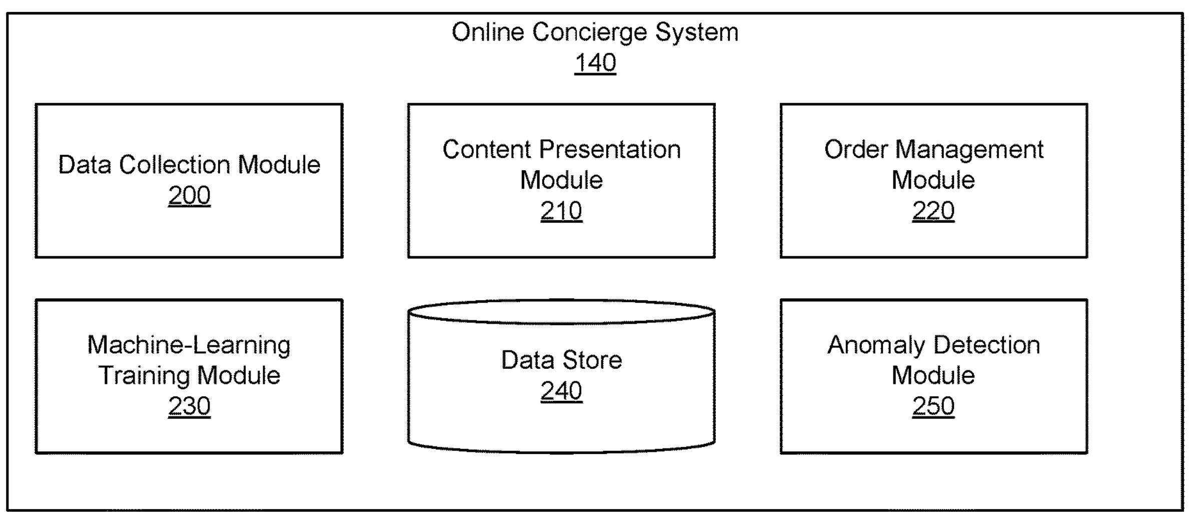
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The anomaly detection module 250 detects when an anomalous number of interruption events have occurred within an application workflow of a client application. The anomaly detection module 250 maintains an interruption log that contains entries that represent when interruption events occur and include the application workflow state of the client application when the interruption event occurred. The anomaly detection module 250 also uses an interruption prediction model to predict a number of interruption events that will occur during a time period. If the actual number exceeds the predicted number by a threshold value, the anomaly detection module 250 may perform remedial actions to remedy a potential issue with the online concierge system. A method for predicting the number of interruption events to occur during a time period and determining whether the interruption events represent an issue with the online concierge system is described in further detail below.

Figure 3:
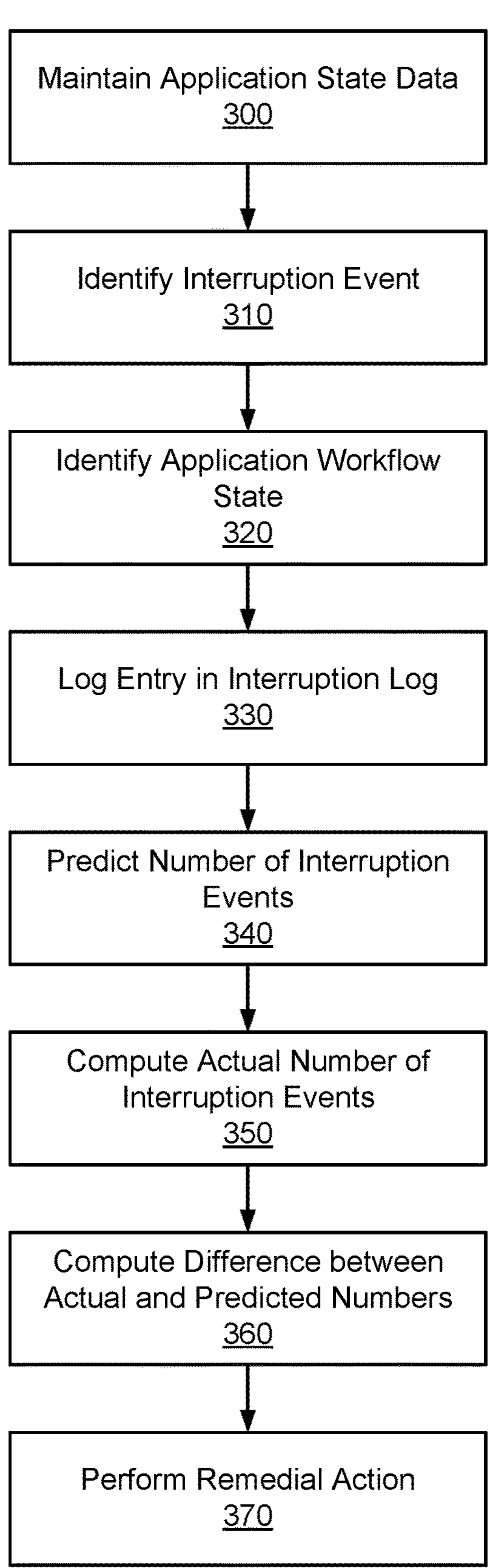
FIG. 3 is a flowchart for a method of detecting numbers of interruption events in an application workflow, in accordance with some embodiments.

FIG. 3 is a flowchart for a method of predicting numbers of interruption events in an application workflow, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

As described above, a client device may execute a client application that corresponds to the online concierge system. For example, the customer client device 100 may execute a customer client application through which a customer can place an order with the online concierge system. Similarly, the picker client device 110 may execute a picker client application through which a picker receives information for servicing an order.

A client application may have an application workflow through which a user progresses to accomplish some result. For example, the application workflow for a customer client application may be the workflow through the customer client application to place an order. Similarly, the application workflow for a picker client application may be the workflow through the picker client application to service an order or a batch of orders. An application workflow includes a set of steps that a user performs within the client application to achieve the end result. For example, a customer who is progressing through the application workflow to place an order may perform the steps of: selecting a retailer to receive items from; placing search queries; selecting items from search results; providing payment information; providing delivery location information; and finalizing order.

Each step of an application workflow has a corresponding state within the client application. Each of these states may have different software modules within the client application that are executed when the client application is in that state. For example, a customer client application may execute software code to display search results to the customer. Similarly, a state within the application workflow may have corresponding software modules that are executed by the online concierge system. For example, for a customer to select items from search results, the online concierge system may execute software code that selects items for presentation to a user in response to a search query.

The online concierge system maintains 300 application state data for a client application executing on a client device. Application state data is data describing application states of a client application. The application state data may include a current state of the client application and a set of prior states through which the client application passed to reach the current state. The online concierge system may receive state logs from the client device indicating the states of the client application as the user progresses through the application workflow. The online concierge system also may maintain the application state data by instructing the client device to store logs describing the states of the application workflow through which the user progresses. In some embodiments, the online concierge system removes the application state data for a client application when the user has completed the application workflow and has achieved the corresponding end result.

In some embodiments, the online concierge system uses a state machine to store the application state data. Each node of the state machine represents a state of the application workflow and each edge represents a transition between one state of the application workflow to another state of the application workflow. The online concierge system may maintain the application state data for a client application by tracking the state of the client application with the state machine as the user progresses through the application workflow. For example, the online concierge system may instruct the client application to log each transition between states of the application workflow. The client device may transmit these logged transitions to the online concierge system.

Figure 4:
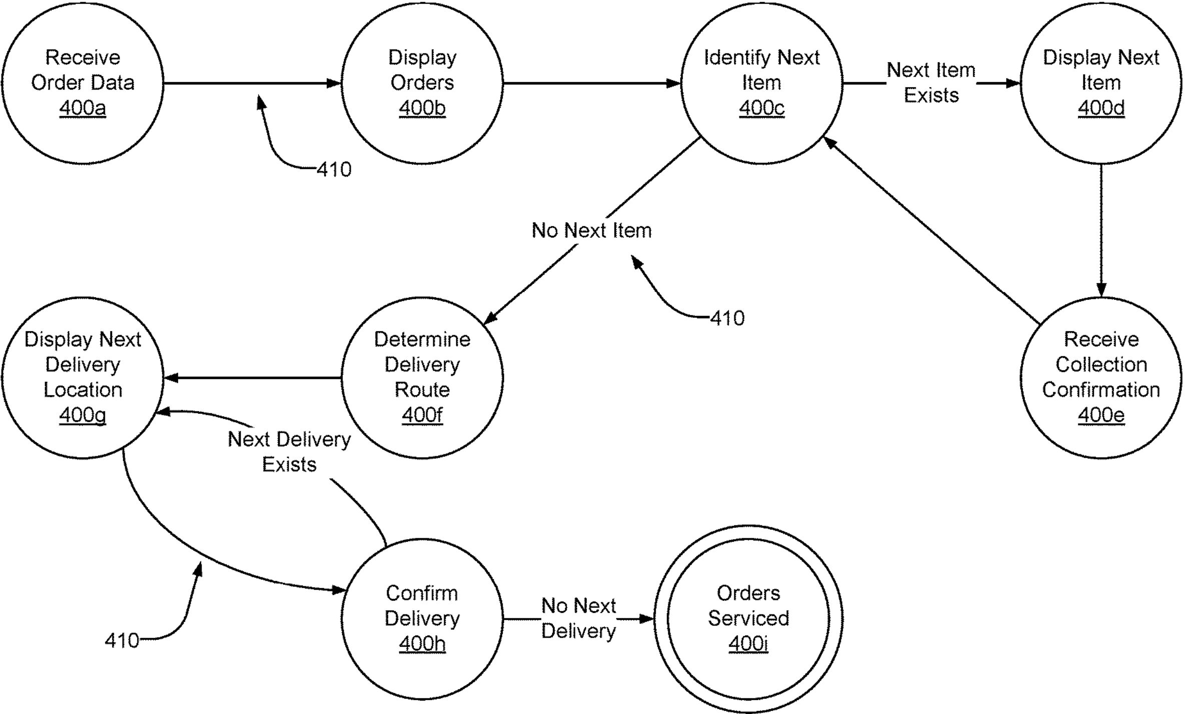
FIG. 4 illustrates an example state machine for an application workflow through a client application operating on a picker device, in accordance with some embodiments.

FIG. 4 illustrates an example state machine for an application workflow through a client application operating on a picker device, in accordance with some embodiments. The state machine has a set of states 400 (e.g., 400*a*-400*i*), each of which corresponds to a state of an application workflow through the client application. Each state has an edge 410 that directs to another state, with some states having an edge to more than one state depending on the user's actions.

The online concierge system identifies 310 an interruption event at the client application. An interruption event is an event or instance where the client application fails to perform correctly such that the application workflow cannot be completed. For example, an interruption event may occur when a fatal error or exception (i.e., a "crash") occurs at the client device. The online concierge system may identify the interruption event by receiving a transmitted message from the client device indicating that the client application has crashed, that the client application has unexpectedly restarted, or that the client application has failed to respond to a message transmitted by the online concierge system. In some embodiments, the online concierge system identifies an interruption event at the client application by identifying an error that occurs at the online concierge system as part of the execution of the application workflow. For example, the online concierge system may experience an error when identifying which item a picker should collect next within a retailer location as part of servicing an order and may fail to provide an item to the picker client application to present to the picker. The online concierge system may identify this error as an interruption event.

The online concierge system identifies 320 a current state of the application workflow at the time of the interruption event. The online concierge system may identify a most recent transition of the state machine that represents the application workflow based on logged transitions at the client device, and may identify the destination state of the transition as the current state of the client application.

The online concierge system logs 330 an entry in an interruption log for the interruption event. An interruption log is a log of interruption events at client applications. The interruption log stores a set of entries, each of which describing an interruption event. Each entry may include data describing the interruption event, such as a type of the interruption event or a timestamp when the interruption event occurred. Additionally, each entry may indicate the state of the application workflow when the interruption event occurred. The interruption log may store entries for interruption events from multiple client devices. In some embodiments, if the online concierge system supports multiple application workflows (e.g., a customer application workflow and a picker application workflow), the online concierge system stores an interruption log for each workflow, where each interruption log stores interruption events that occur as a client application performs a corresponding application workflow.

The online concierge system uses the logged interruption events to identify when an application workflow is experiencing an atypical number of interruption events. For example, the online concierge system may train an interruption detection model based on stored interruption logs. An interruption detection model is a machine-learning model that is trained to predict a number of interruption events that will occur during a time period. To predict the number of interruption events that will occur during a time period, the interruption detection model is applied to order data describing orders that were placed during the time period. For example, the order data may include how many orders were placed during the time period, which users placed the orders, which pickers were assigned to service the orders, which items were included in the orders, which retailers were ordered from, or the delivery locations for orders. The interruption detection model also may be applied to context data describing a context for the time period. For example, the context data may include weather data during the time period, retailer data describing characteristics of retailers using the online concierge system, device information describing types of client devices used by users, or network data describing characteristics of a network used for communicating between the client devices and the online concierge system.

In some embodiments, the interruption detection model predicts a number of interruption events for a target state of an application workflow. In other words, the interruption detection model may receive an identifier for an application workflow state and may predict how many interruption events will occur during a time period when the application workflow's current state was the identified state.

The interruption detection model may be trained based on a set of training examples. Each training example may include order data for a time period, context data for the time period, and a label that indicates the number of interruption events that occurred during the time period. In some embodiments, each training example further includes an identifier for the application workflow state for which the training example relates.

The online concierge system predicts 340 a number of interruption events that will occur during a time period. As noted above, the predicted number of interruption events may relate to interruption events that occur while the application workflow is in a particular state. The time period may be some subsequent period after the predicted number is generated (e.g., the next 24 hours) or may be some determined period (e.g., within a future day, week, or month). As noted above, the online concierge system may predict the number of interruption events by applying an interruption detection model to context data, order data, or an identifier for an application workflow state during which the predicted number of interruption events will occur.

The online concierge system computes 350 the actual number of interruption events that occurred during that time period after the time period ends. The online concierge system may compute the actual number of interruption events based on interruption logs that store entries for interruption events that occurred during the time period. The online concierge system computes 360 a difference between the actual number of interruption events and the predicted number of events to determine whether an anomalous number of interruption events occurred during the time period. For example, the online concierge system may compare the computed difference to a threshold value. If the difference is less than the threshold value, then the online concierge system may determine that the actual number of interruption events was not anomalous and continue to operate accordingly. The difference may be the actual difference between the actual number of interruption events and the predicted number of interruption events, or may be a percentage difference or ratio of the two numbers. Similarly, the threshold value may be a threshold percentage difference or ratio.

In some embodiments, the online concierge system may compute the actual number of interruption events that correspond to a particular application workflow state and compute a difference between that actual number and a predicted number of interruption events for that application workflow state. The online concierge system may compare that computed difference to a threshold value corresponding to the particular application workflow state to determine whether an anomalous number of interruption events occurred for that state. The online concierge system may compute this difference for each state in an application workflow to identify a state with an anomalous number of interruption events during a time period.

Figure 5:
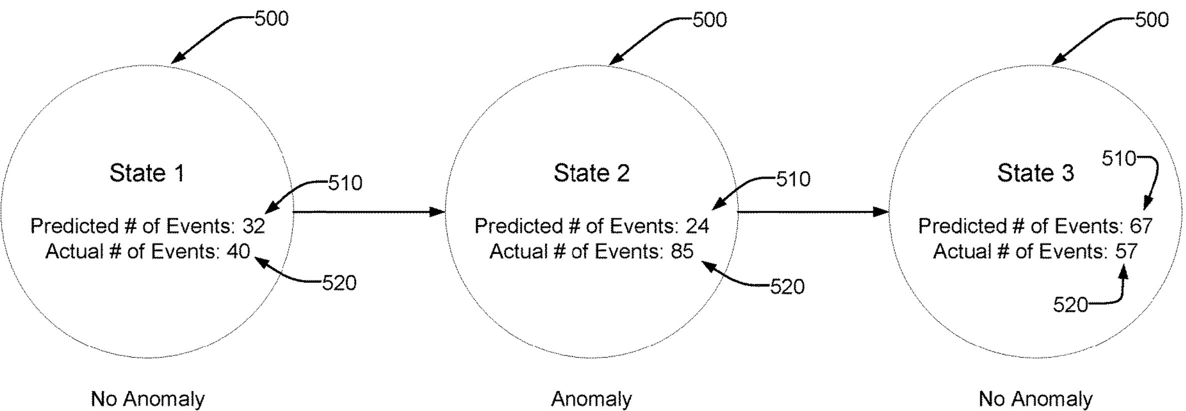
FIG. 5 illustrates example application workflow states with predicted numbers of interruption events and actual numbers of interruption events, in accordance with some embodiments.

FIG. 5 illustrates example application workflow states 500 with predicted numbers of interruption events 510 and actual numbers of interruption events 520, in accordance with some embodiments. As described above, the online concierge system may compute a difference between the predicted number of interruption events and the actual number of interruption events and compare the difference to a threshold value. In the embodiment illustrated in FIG. 5, the threshold value is where the actual number of interruption events is twice the number of predicted interruption events. In other words, the online concierge system detects an anomalous number of interruption events when the actual number is at least twice the predicted number. Thus, State 2 in FIG. 5 is detected as being anomalous, whereas States 1 and 3 are not.

If the computed difference meets or exceeds the threshold value, the online concierge system performs 370 a remedial action. A remedial action is an action that the online concierge system performs to address a detected anomaly in the number of interruption events that occurred during a time period. For example, the online concierge system may notify a human operator of the online concierge system that an anomalous number of interruption events was detected. In embodiments where the online concierge system detects an anomalous number of interruption events for a particular application workflow state, the online concierge system may identify a human operator associated with the workflow state and notify that operator of the anomaly. Other example remedial actions include temporarily disabling a feature of a client application, notifying users of potential interruption events, providing consideration to users affected by interruption events, or collecting additional data related to the interruption events.

While the steps described above are predominantly described as performed by the online concierge system, some or all of the steps may be performed by a client device in communication with the online concierge system. For example, a client device may identify interruption events that occur in a client application operating on the client device, identify which application workflow state corresponds to the interruption events, log the interruption events as entries in an interruption log stored on the client device, or perform remedial actions in response to the difference between a predicted number of interruption events and an actual number of interruption events during a time period exceeding a threshold value.

Furthermore, while the description above predominantly describes the method as performed in the context of an online concierge system, the methods described herein may be performed in other contexts where a client application performs an application workflow towards an end result. For example, the method may be performed in a ride-sharing context where a user is requesting a ride or a video-streaming context where a user is requesting a video to be streamed to them.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, at a computer system comprising a processor and a computer-readable medium, comprising:

maintaining application state data for a plurality of client devices, wherein the application state data describes current states within an application workflow of a client application operating on the plurality of client devices;

identifying one or more interruption events at the client application on one or more of the plurality of client devices, wherein each interruption event represents an interruption to the application workflow of the corresponding user;

identifying states within the application workflow of the client application at times of the interruption events based on the maintained application state data for the client devices;

logging entries in an interruption log for the interruption events and the identified states, wherein the interruption log comprises a plurality of entries of interruption events and states of application workflows corresponding to those interruption events;

predicting a number of interruption events for a target state of the application workflow within a time period by applying an interruption prediction model to context data describing the time period and order data describing a plurality of orders placed by a plurality of users of an online system, wherein the interruption prediction model is a machine-learning model that is trained to predict the number of interruption events within time periods based on context data and order data;

computing an actual number of interruption events for the target state during the time period based on the interruption log;

comparing the predicted number of interruption events to the actual number of interruption events; and performing a remedial action based on the comparing of the predicted number of interruption events to the actual number of interruption events.

2. The method of claim 1, wherein maintaining the application state data for the plurality of client devices comprises:

maintaining the current states of the plurality of client devices using a state machine representing a plurality of states of the application workflow.

3. The method of claim 2, wherein identifying states of the application workflow comprises:

identifying a most-recent transition within the state machine.

4. The method of claim 1, wherein the client application comprises a picker client application operated by pickers of an online concierge system.

5. The method of claim 1, wherein the client application comprises a customer application operated by customers of an online concierge system.

6. The method of claim 1, wherein one of the identified interruption events comprises a fatal error of the client application on a client device.

7. The method of claim 1, wherein comparing the predicted number of interruption events to the actual number of interruption events comprises:

computing a ratio of the actual number of interruption events to the predicted number of interruption events.

8. The method of claim 1, wherein comparing the predicted number of interruption events to the actual number of interruption events comprises:

computing a percentage difference between the actual number of interruption events and the predicted number of interruption events.

9. The method of claim 1, wherein performing a remedial action comprises:

transmitting a notification to a human operator of the online system, wherein the notification identifies the target state.

10. A non-transitory computer-readable medium storing instructions that, when executed by a processor, cause the processor to perform operations comprising:

maintaining application state data for a plurality of client devices, wherein the application state data describes current states within an application workflow of a client application operating on the plurality of client devices;

identifying one or more interruption events at the client application on one or more of the plurality of client devices, wherein each interruption event represents an interruption to the application workflow of the corresponding user;

identifying states within the application workflow of the client application at times of the interruption events based on the maintained application state data for the client devices;

logging entries in an interruption log for the interruption events and the identified states, wherein the interruption log comprises a plurality of entries of interruption events and states of application workflows corresponding to those interruption events;

predicting a number of interruption events for a target state of the application workflow within a time period by applying an interruption prediction model to context data describing the time period and order data describing a plurality of orders placed by a plurality of users of an online system, wherein the interruption prediction model is a machine-learning model that is trained to predict the number of interruption events within time periods based on context data and order data;

computing an actual number of interruption events for the target state during the time period based on the interruption log;

comparing the predicted number of interruption events to the actual number of interruption events; and performing a remedial action based on the comparing of the predicted number of interruption events to the actual number of interruption events.

11. The non-transitory computer-readable medium of claim 10, wherein maintaining application state data for a client device comprises:

maintaining a current state of a client device using a state machine representing a plurality of states of the application workflow.

12. The non-transitory computer-readable medium of claim 11, wherein identifying states of the application workflow comprises:

identifying a most-recent transition within the state machine.

13. The non-transitory computer-readable medium of claim 10, wherein the client application comprises a picker client application operated by pickers of an online concierge system.

14. The non-transitory computer-readable medium of claim 10, wherein the client application comprises a customer application operated by customers of an online concierge system.

15. The non-transitory computer-readable medium of claim 10, wherein one of the identified interruption events comprises a fatal error of the client application on a client device.

16. The non-transitory computer-readable medium of claim 10, wherein comparing the predicted number of interruption events to the actual number of interruption events comprises:

computing a ratio of the actual number of interruption events to the predicted number of interruption events.

17. The computer-readable medium of claim 10, wherein comparing the predicted number of interruption events to the actual number of interruption events comprises:

computing a percentage difference between the actual number of interruption events and the predicted number of interruption events.

18. A system comprising a processor and a non-transitory computer-readable medium, wherein the non-transitory computer-readable medium stores instructions that, when executed by the processor, cause the processor to perform operations comprising:

maintaining application state data for a plurality of client devices, wherein the application state data describes current states within an application workflow of a client application operating on the plurality of client devices;

identifying one or more interruption events at the client application on one or more of the plurality of client devices, wherein each interruption event represents an interruption to the application workflow of the corresponding user;

identifying states within the application workflow of the client application at times of the interruption events based on the maintained application state data for the client devices;

logging entries in an interruption log for the interruption events and the identified states, wherein the interruption log comprises a plurality of entries of interruption events and states of application workflows corresponding to those interruption events;

predicting a number of interruption events for a target state of the application workflow within a time period by applying an interruption prediction model to context data describing the time period and order data describing a plurality of orders placed by a plurality of users of an online system, wherein the interruption prediction model is a machine-learning model that is trained to predict the number of interruption events within time periods based on context data and order data;

computing an actual number of interruption events for the target state during the time period based on the interruption log;

comparing the predicted number of interruption events to the actual number of interruption events; and performing a remedial action based on the comparing of the predicted number of interruption events to the actual number of interruption events.

* * * * *